(12) United States Patent
Wilson

(10) Patent No.: US 6,581,430 B2
(45) Date of Patent: Jun. 24, 2003

(54) METHOD OF MAKING AN EYEWEAR FRAME

(76) Inventor: Ken Wilson, 8550 Costa Verde Blvd. #5427, San Diego, CA (US) 92122

( * ) Notice: Subject to any disclaimer, the term of this patent is extended or adjusted under 35 U.S.C. 154(b) by 0 days.

(21) Appl. No.: 09/999,614

(22) Filed: Oct. 25, 2001

(65) Prior Publication Data
US 2003/0079514 A1 May 1, 2003

(51) Int. Cl.[7] .............................................. B21C 23/00
(52) U.S. Cl. ............................ 72/254; 72/324; 72/338; 72/340; 72/379.2; 29/20; 351/178
(58) Field of Search .......................... 72/254, 256, 324, 72/338, 339, 340, 341, 176, 177, 182, 203, 379.2; 29/20; 351/178

(56) References Cited

U.S. PATENT DOCUMENTS

| | | | | |
|---|---|---|---|---|
| 4,078,283 A | * | 3/1978 | Choquette | 29/20 |
| 5,182,817 A | * | 2/1993 | Branum | 2/439 |
| 5,583,583 A | * | 12/1996 | Wilson | 351/41 |
| 5,980,602 A | * | 11/1999 | Carden | 75/236 |
| 6,276,796 B1 | * | 8/2001 | Lindberg et al. | 351/90 |
| 6,435,680 B2 | * | 8/2002 | Mocciaro | 351/83 |

* cited by examiner

Primary Examiner—Ed Tolan
(74) Attorney, Agent, or Firm—Charles C. Logan, II

(57) ABSTRACT

A method of making an eyewear frame comprising the initial step of extruding an elongated billet of substantially rigid material having a top surface having predetermined convex cross-sectional initially as extruded curvature and a bottom surface having a predetermined concave cross-sectional initially as extruded curvature. The next step involves mounting a predetermined length of the elongated billet in a holding fixture of a computer numerical control (CNC) cutting machine. Next the CNC cutting machine is operated to cut out predetermined lens apertures and a finished eyewear frame around each of the previously machined lens apertures thereby producing a substantially stress free eyewear frame that is ready to have a stress free lens installed in its lens aperture.

27 Claims, 3 Drawing Sheets

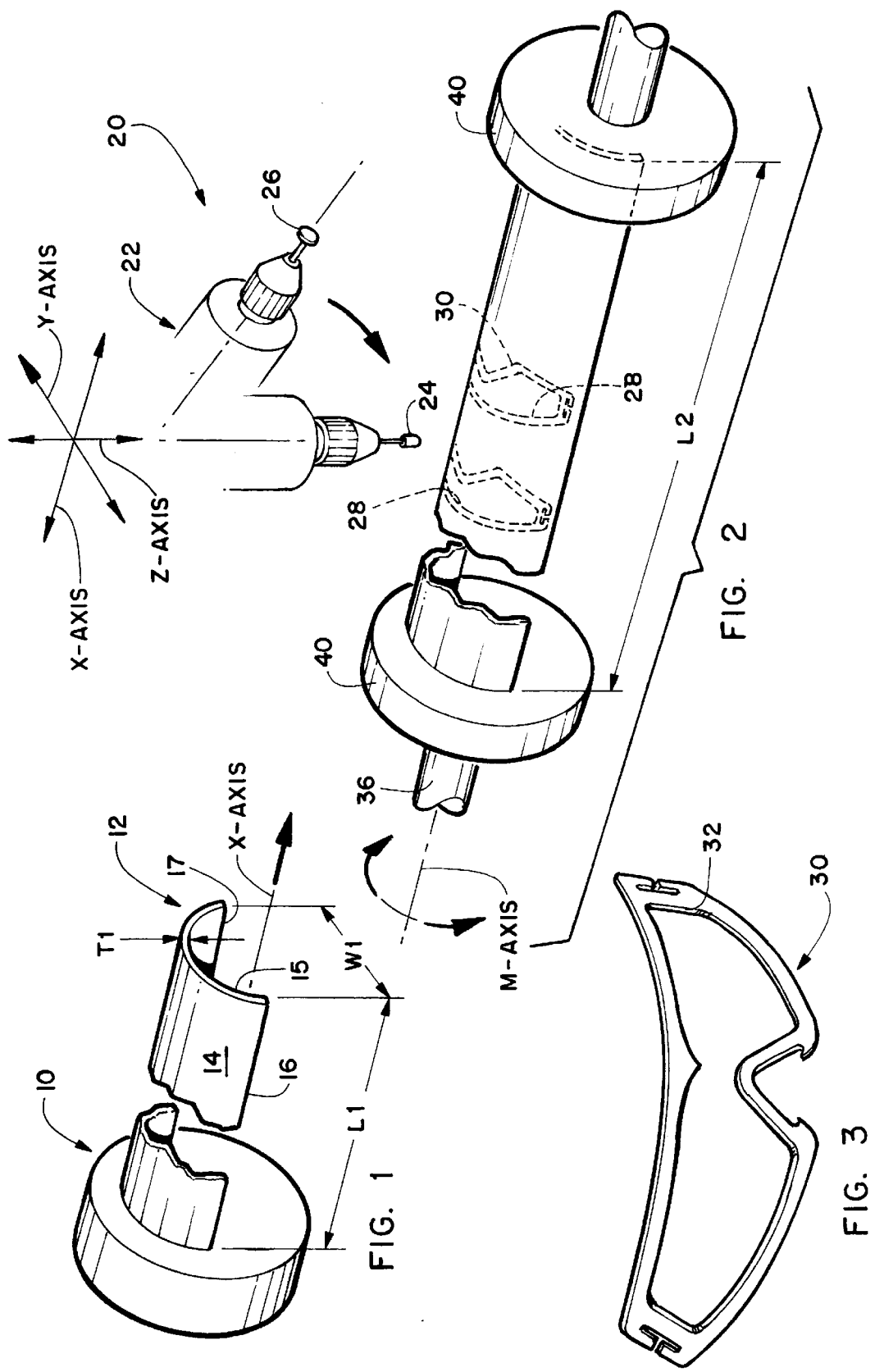

METHOD OF MAKING AN EYEWEAR FRAME

BACKGROUND OF THE INVENTION

The invention relates to eyewear frames and more specifically one whose front and rear surface curvatures remain substantially the same as their initial extruded curvature for the finished eyewear frame that has been cut out of an extruded billet of rigid material.

Eyewear frames encompass goggle frames, eyeglass frames and sunglasses frames. Most of the prior art eyewear frames are made of flexible plastic material. The lenses of these eyewear frames are normally flexed when installing them thereby producing internal stresses in the lenses and sometimes in the frames themselves. A major disadvantage of these assembled eyewear members is the fact that the stresses produce distortion in the lenses and the images viewed through the lenses are distorted. The use of metal frames for eyeglasses has been used for years. However these frames are not very strong and definitely not rigid and are often bent during use, when dropped, or by sitting or stepping on them. They are also rarely used with flexible plastic lenses.

About ten years ago an attempt was made to produce a rigid frame by forming it out of cast aluminum. This eyewear frame was the Briko snow ski goggle. It had a very thin flexible lens that had to be bent for insertion into the eyeframe and this curvature caused distortion of the images viewed by the wearer. Also its retention wall was very thin and often a blow to the frame caused the lens to pop out of the frame. It was definitely not a good design for impact type activities.

No one has designed and made a substantially rigid eyewear frame by using an extrusion process. Some of the applications for a rigid eyewear frame having a lens that would not pop out easily would be for paintball participants, military police, swat teams, the firearms shooting market, etc.

The Wilson U.S. Pat. No. 5,583,583 is directed to a metal frame for sunglasses and the method of making the same. A flat sheet of metal was cut in the predetermined shape of a sunglasses frame and it was heat treated in an annealing process to allow the frame to be bent into a predetermined concave curvature. It was heat treated to harden the material of the frame. An undesirable trait of this sunglass frame was that it would flex causing distortion of the lens and this was undesirable. Also when bent, the resulting radius was not constant.

It is an object of the invention to provide a novel rigid eyewear frame that can be used for goggles, eyeglasses and sunglasses.

It is also an object of the invention to provide a novel eyewear frame that begins as an extruded rigid billet of material such as metal or plastic.

It is also an object of the invention to provide a novel eyewear frame that has a rigid frame for receiving stress free lenses.

It is another object of the invention to provide an novel eyewear frame whose final configuration is substantially stress free since its curvature still remains substantially the same as when it was extruded.

It is a further object of the invention to provide a novel eyewear frame that has been designed for high impact activities and which has been designed so that its lens will not pop out easily upon impact.

It is also an object of the invention to provide a novel eyewear frame having structure that allows a stress free lens to be removably inserted therein and remain distortion free.

SUMMARY OF THE INVENTION

The novel method of manufacturing a stress free eyewear frame begins with the step of extruding a billet of rigid material from the extrusion die of an extrusion machine. The material could be a rigid aluminum alloy, a rigid titanium alloy, a hard plastic such as polycarbonate or other such acceptable materials having a petroleum base. If the material is a metal it would need a Rockwell hardness in the range of 20–110C. If the material is plastic it would have a Rockwell hardness in the range 80–130A.

As the billet of material is extruded, it has a top surface having a predetermined convex cross-sectional initially as extruded curvature and a bottom surface having a predetermined concave cross-sectional initially as extruded curvature. The length of the extruded billet could be as short as necessary in order to cut out only a single eyewear frame or it could be an extremely long, 50 feet or more, for cutting out multiple eyewear frames.

A predetermined length of the extruded billet would be attached to the holding fixture of a CNC machine capable of movement about at least 4 axes or as many as five axes. The CNC machine would have a turret head mill having a cutter mounted on one of its heads for milling the aperture of the eyewear frame. Another groove cutter would be mounted on another head for forming the groove in the lens aperture for receiving the lens. A cutter mounted on a mill head would also be used to cut the outer configuration of the eyewear frame. The eyewear frame would be substantially in its finished condition when it is removed from the holding fixture of the CNC machine or could be slightly altered by a bending press. Any small tab structure or rough edges along the outer edge of the eyewear frame can be easily removed. The resulting front surface of the finished eyewear frame would have the same predetermined convex cross-sectional initially as extruded curvature that it had in the initially extruded sheet. Likewise the rear surface of the finished eyewear frame would have the same predetermined concave cross-sectional initially as extruded curvature as found in the initially extruded sheet. Thus an eyewear frame has been produced free of any internal stresses such as would normally be found when forming an eyewear frame that requires a bending step to bring it to its final curvature. The eyewear frame could also be formed with two lens apertures.

DESCRIPTION OF THE DRAWING

FIG. 1 is a schematic front perspective view illustrating the front end of an extrusion machine showing an extruded sheet coming out from the extrusion die;

FIG. 2 is a schematic partial front perspective view of a CNC cutting machine and the holding fixture;

FIG. 3 is a front perspective view of a stress free eyewear frame that has been formed on the CNC machine;

DESCRIPTION OF THE PREFERRED EMBODIMENT

Figure 4:
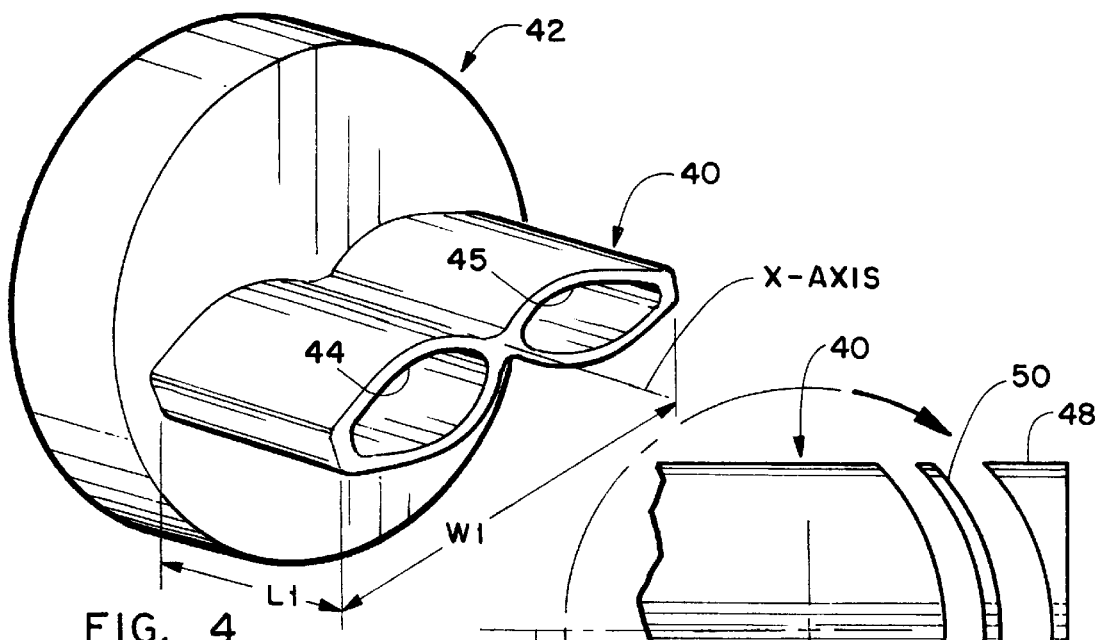
FIG. 4 is a schematic first perspective view illustrating the front end of an extrusion machine showing a first alternative extruded billet coming out of the extrusion die.

The novel method of manufacturing an eyewear frame will be described by referring to FIGS. 1–3 of the drawing. FIG. 1 is a schematic front perspective view of the extrusion die 10 of an extrusion machine. An extruded billet 12 is seen exiting extrusion die 10 and it has a top surface 14, a bottom surface 15, a left edge 16 and a right edge 17. Extruded billet 12 has a longitudinally extending X-axis and it has a length L1 that may be in the range of 2" to 100 or more feet long. Extruded billet 12 has a width W1 in the range of 4"–9". It also has a thickness T1 in the range of 0.100 to 0.400 inches.

FIG. 2 is a schematic partial front perspective view of a CNC machine 20 that may be a 4 axis, or a 5-axis machine. CNC machine 20 is shown to have a turret head mill 22 capable of motion about an X-axis, a Y-axis and a Z-axis. One of the heads of the turret head mill has a cutter 24 mounted thereon and another mill head has a groove cutter 26 mounted thereon. Cutter 24 would be used to cut the lens aperture 28 and also the outer configuration of the eyewear frame 30. Groove cutter 26 would be used to cut the lens groove in the lens aperture 28. The CNC machine 20 also has a shaft 36 rotatable about the M-axis. A holding fixture 40 supports the end of a length L2 of an extruded billet 12. L2 may be in the range of 2–48 inches.

FIG. 3 is a front perspective view of the stress free eyewear frame 30 that has been cut out of extruded sheet 12. Prior to eyewear frame 30 having been cut out of extruded billet 12, extruded billet 12 had a top surface having a predetermined convex cross-sectional initially as extruded curvature. The bottom surface of extruded billet 12 had a predetermined concave cross-sectional initially as extruded curvature. The finished machined eyewear frame 30 has substantially the same front and rear predetermined curvatures as originally found in extruded billet 12. This produces an eyewear frame free from all internal stresses and one which is ready to receive a stress free lens in lens grooves 32. Eyewear frame 30 could be a goggle frame, an eyeglass frame or a sunglass frame.

Figure 7:
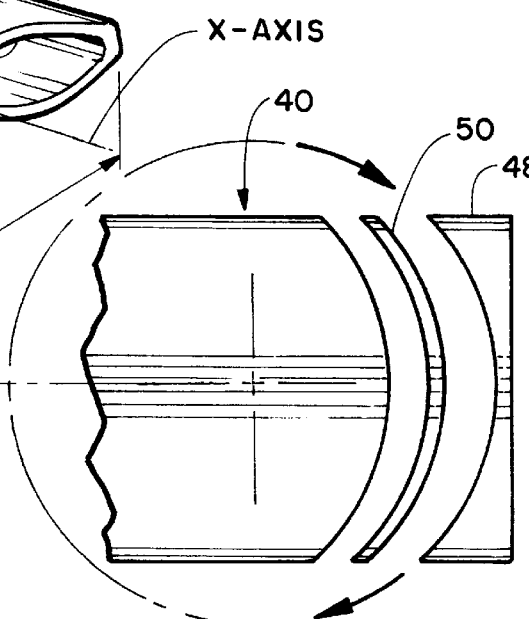
FIG. 7 is a schematic top plan view illustrating how the individual eyewear frames are cut off the front end of the extruded billet.
Figure 5:
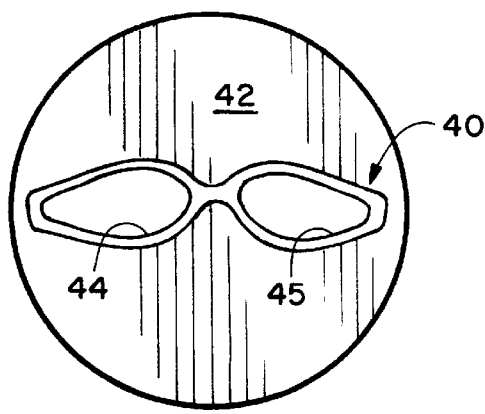
FIG. 5 is a schematic front perspective view illustrating the CNC cutting machine cutting the grooves in the lens aperture of the extruded billet.
Figure 6:
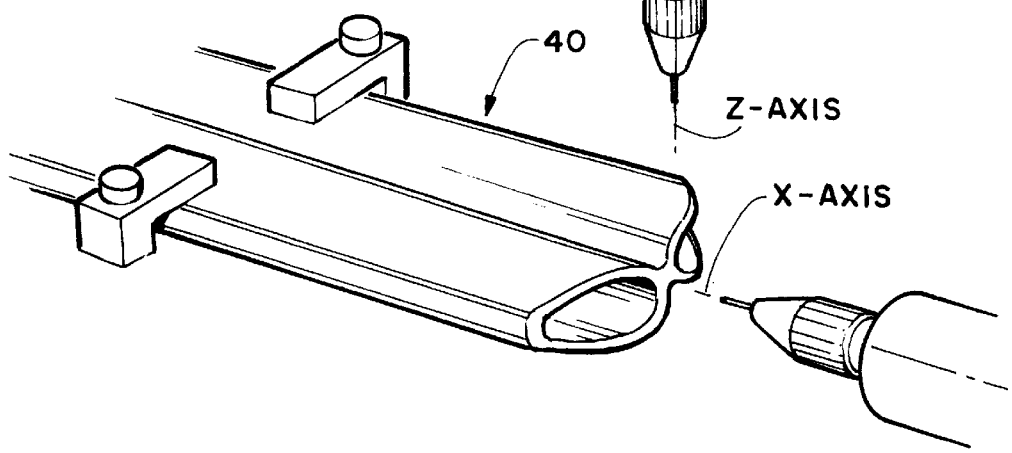
FIG. 6 is a schematic front elevation view of the first alternative extruded billet coming out of the extrusion die as seen in FIG. 4.

An alternative extruded billet 40 is illustrated in FIGS. 4 and 5 emerging from the die 42 of an extrusion machine. Extruded billet 40 has apertures 44 and 45 that extend the length of extruded billet 40. In FIG. 6 the lens grooves 46 are machined into the front surface of extruded billet 40 by one of the milling heads of the CNC machine 20. FIG. 7 illustrates two different cuts. The first cut by the CNC machine removes scrap or waste material 48 and provides the front surface of extruded billet 40 with the convex curvature of the finished eyewear frame 30. The second cut illustrated in FIG. 7 would take place after the CNC cuts the lens grooves in the front surface of extruded billet 40. The second cut by one of the cutters of CNC machine 20 (see FIG. 7) would cut the rear concave curvature of the finished eyewear frame 30. The finished eyewear frame 50 would thus be stress free and ready to have stress free lenses mounted in the respective lens apertures 44 and 45. Successive finished eyewear frames 50 would be sequentially removed from the front end of extruded billet 40 by first machining the lens grooves in the front surface of extruded billet 40 followed by cutting an additional eyewear frame off the front end of extruded billet 40. The previously described sequence would continue until the entire useable length of extruded billet 40 has had all of its eyewear frames cut from the extruded billet.

Figure 8:
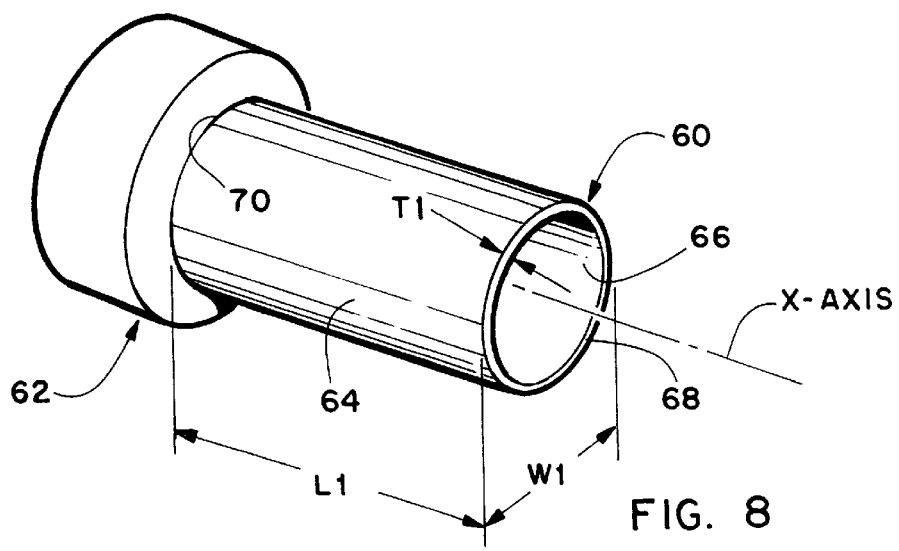
FIG. 8 is a schematic front perspective view illustrating the front end of an extrusion machine showing an extruded tubular cylinder billet coming out from the extrusion die.

Another alternative extruded tubular cylindrical billet 60 is illustrated in FIG. 8. Billet 60 is seen exiting from extrusion die 62 and it has an outer surface 64, an inner surfaces 66, a front end 68 and a rear end 70. Extruded billet 60 has a longitudinally extending X-axis and it has a length L1 that may be in the range of 2" to 100 feet or more long. Extruded billet 60 has a width W1 in the range of 4"–9". It also has a thickness T1 in the range of 0.100 to 0.400 inches. A predetermined length of billet 60 would be mounted in holding fixture 40 and CNC machine 20 would be used to cut the lens aperture 28 and also the outer configuration of the eyewear frame 30 in the manner previously discussed with regard to FIG. 2.

Figure 9:
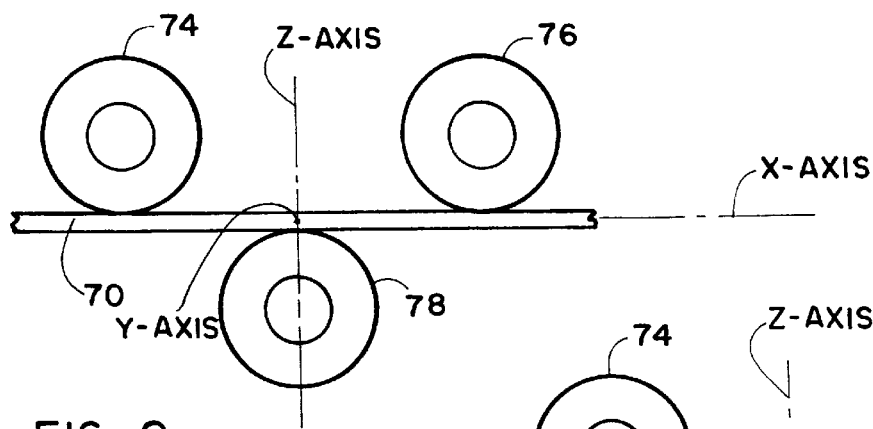
FIGS. 9–11 schematically illustrated the manner in which a flat sheet or plate is sequentially roll formed into a half cylinder shaped billet.
Figure 10:
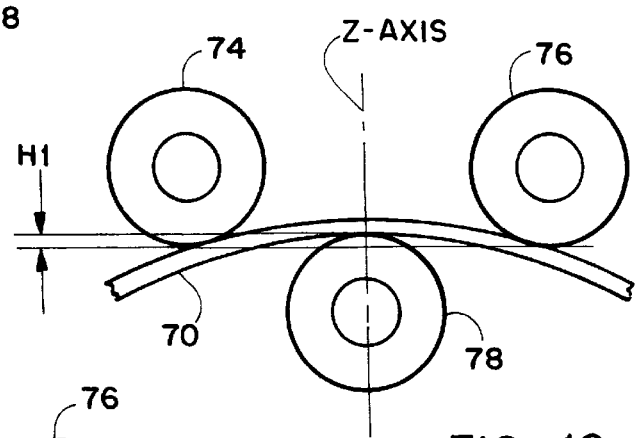
Figure 11:
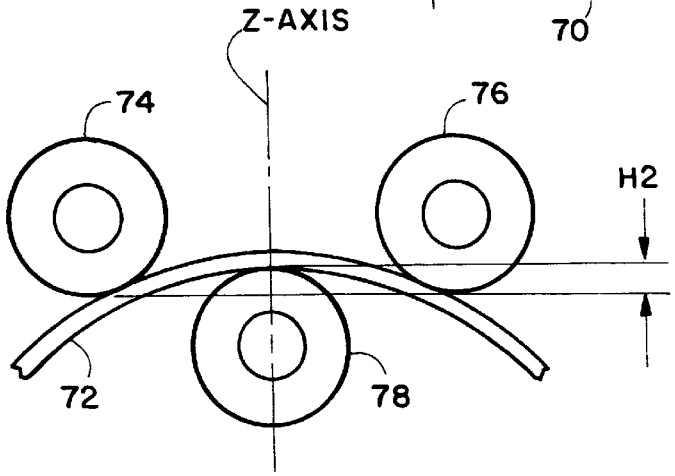

Referring to FIGS. 9–11, a method of forming a billet 72 having the same shape as billet 14 from a flat sheet or plate 70 will now be described. In FIG. 9 the flat sheet or plate 70 is fed along the X-axis below rollers 74 and 76 and above roller 78. Roller 78 is then raised sequentially along the Z-axis and flat sheet 70 is fed back and forth along the Y-axis. In FIG. 10 roller 78 has been raised a height H1 and sheet 70 now has a concave bottom surface. In FIG. 11 roller 78 has been raised a height H2 and flat sheet 70 has become billet 72 having the same shape as billet 14 in FIG. 1. Additional rollers may be used and it would also be possible to make roller 78 stationary and move rollers 74 and 76 downwardly. Billet 72 has a longitudinally extending X-axis and it has a length L1, a width W1 and a thickness T1. A predetermined length of billet 72 would be mounted in holding fixture 40 and CNC machine 20 would be used to cut the lens aperture 28 and also the outer configuration of the eyewear frame 30 in the manner previously discussed with regard to FIG. 2.

What is claimed is:

1. A method of making an eyewear frame comprising the following steps:
    a) forming an elongated extruded billet of substantially rigid material having a longitudinally extending X-axis and a predetermined length L1; said billet having a top surface, a bottom surface, a left edge and a right edge; said top surface having a predetermined convex cross-sectional initially as extruded curvature; said bottom surface having a predetermined concave cross-sectional initially as extruded curvature;
    b) mounting a predetermined length L2 of said elongated billet in a holding fixture;
    c) operating a cutting machine to cut out at least one predetermined lens aperture; and
    d) operating said cutting machine to cut out an eyewear frame around said previously machined lens apertures thereby producing a substantially stress free eyewear frame that is ready to have a stress free lens installed in said lens aperture.

2. A method of making an eyewear frame as recited in claim 1 wherein said extruded billet is made of a aluminum alloy.

3. A method of making an eyewear frame as recited in claim 1 wherein said extruded sheet is made of a titanium alloy.

4. A method of making an eyewear frame as recited in claim 1 wherein said extruded billet is made of a synthetic base material.

5. A method of making an eyewear frame as recited in claim 1 further comprising the step of (e) removing any tabs around the outer edges of each of said finish formed eyewear frames.

6. A method of making an eyewear frame as recited in claim 1 wherein said finished eyewear frame has substantially the same concave and convex curvatures as initially formed in said extrusion.

7. A method of making an eyewear frame as recited in claim 1 wherein said cutting machine is a CNC cutting machine.

8. A method of making an eyewear frame as recited in claim 1 wherein a plurality of eyewear frames are formed by repeating steps (c) and (d).

9. A method of making an eyewear frame as recited in claim 1 wherein said finish formed eyewear frame is a goggle frame.

10. A method of making an eyewear frame as recited in claim 1 wherein said finished formed eyewear frame is an eyeglasses frame.

11. A method of making an eyewear frame as recited in claim 1 wherein said finished formed eyewear frame is a sunglasses frame.

12. A method of making an eyewear frame as recited in claim 1 wherein L1 is in the range of 2"–50'.

13. A method of making an eyewear frame as recited in claim 1 wherein L2 is in the range of 2 inch to 100 feet.

14. A method of making an eyewear frame as recited in claim 1 wherein T1 is in the range of 0.020"–0.400".

15. A method of making an eyewear frame as recited in claim 1 wherein W1 is in the range of 2 inch to 9 inches.

16. A method of making an eyewear frame comprising the following steps:
   a) forming an elongated billet of substantially rigid material having a longitudinally extending X-axis, a front end a predetermined length L1; said billet having a top edge, a bottom edge, a left edge and a right edge; a pair of laterally spaced lens apertures extend parallel to said X-axis along the length of said elongated billet;
   b) mounting a predetermined length L2 of said elongated billet in a holding fixture;
   c) operating a cutting machine to cut a predetermined convex curvature in said front end of said elongated billet from said left edge to said right edge;
   d) operating said cutting machine to cut a pair of lens grooves in said front end of said lens apertures; and
   e) operating said cutting machine to cut off a slice from said front end of said elongated billet to form an eyewear frame having a predetermined concave curvature for its rear surface that extends from said left edge to said right edge of said extruded billet.

17. A method of making an eyewear frame as recited in claim 16 wherein said elongated billet is formed in an extrusion die.

18. A method of making an eyewear frame as recited in claim 16 wherein said cutting machine is a CNC milling machine.

19. A method of making an eyewear frame as recited in claim 16 wherein said elongated billet is made of a hard aluminum alloy.

20. A method of making an eyewear frame as recited in claim 16 wherein said elongated billet is made of a hard titanium alloy.

21. A method of making an eyewear frame as recited in claim 16 wherein said elongated billet is made of a petroleum base material.

22. A method of making an eyewear frame comprising the following steps:
   a) forming an elongated extruded tubular billet of substantially rigid material having a longitudinally extending X-axis and a predetermined length L1; said billet having an outer cylinder surface, an inner cylinder surface, a front end and a rear end; said outer surface having a predetermined convex cross-sectional initially as extruded curvature; said inner surface having a predetermined concave cross-sectional initially as extruded curvature;
   b) mounting a predetermined length L2 of said elongated billet in a holding fixture;
   c) operating a cutting machine to cut out at least one predetermined lens aperture; and
   d) operating said cutting machine to cut out an eyewear frame around said previously machined lens apertures thereby producing a substantially stress free eyewear frame that is ready to have a stress free lens installed in said lens aperture.

23. A method of making an eyewear frame as recited in claim 22 wherein said finished eyewear frame has substantially the same concave and convex curvature as initially formed in said extrusion.

24. A method of making an eyewear frame as recited in claim 22 wherein said cutting machine is a CNC cutting machine.

25. A method of making an eyewear frame comprising the following steps:
   a) taking a substantially flat elongated billet sheet of substantially rigid material having a longitudinally extending X-axis, a top surface, a bottom surface, a left edge, a right edge and a predetermined length L1 and passing said flat billet between a predetermined number of rollers a predetermined number of times to form a modified billet having a top surface having a predetermined convex cross-section and a bottom surface having a predetermined concave cross-section;
   b) mounting a predetermined length L2 said elongated modified billet in a holding fixture;
   c) operating a cutting machine to cut out at least one predetermined lens aperture; and
   d) operating said cutting machine to cut out an eyewear frame around said previously machined lens apertures thereby producing a substantially stress free eyewear frame that is ready to have a stress free lens installed.

26. A method of making an eyewear frame as recited in claim 25 wherein said finished eyewear frame has substantially the same concave and convex curvature as initially formed in said rollers.

27. A method of making an eyewear frame as recited in claim 25 wherein said cutting machine is a CNC cutting machine.

* * * * *